United States Patent
Wang et al.

(10) Patent No.: US 8,171,618 B1
(45) Date of Patent: May 8, 2012

(54) TUNABLE POLE TRIM PROCESSES FOR FABRICATING TRAPEZOIDAL PERPENDICULAR MAGNETIC RECORDING (PMR) WRITE POLES

(75) Inventors: Lei Wang, Fremont, CA (US); Ge Yi, Pleasanton, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 280 days.

(21) Appl. No.: 12/486,706

(22) Filed: Jun. 17, 2009

(51) Int. Cl.
*G11B 5/127* (2006.01)
*H04R 31/00* (2006.01)

(52) U.S. Cl. ............... 29/603.16; 29/603.13; 29/603.14; 29/603.15; 29/603.18; 216/62; 216/65; 216/66; 360/121; 360/122; 360/317; 360/324; 451/5; 451/41

(58) Field of Classification Search ............... 29/603.07, 29/603.13–603.16, 603.18; 216/62, 65, 66; 360/121, 122, 317, 324–327; 451/5, 41; 427/127, 128
See application file for complete search history.

(56) References Cited

U.S. PATENT DOCUMENTS

| | | | |
|---|---|---|---|
| 5,874,010 A | 2/1999 | Tao et al. | |
| 6,329,211 B1 | 12/2001 | Terunuma et al. | |
| 6,539,610 B1 | 4/2003 | Lo et al. | |
| 6,836,957 B2 | 1/2005 | Kobayashi | |
| 6,952,867 B2 | 10/2005 | Sato | |
| 7,061,719 B2 | 6/2006 | Matono et al. | |
| 7,137,191 B2 | 11/2006 | Sato et al. | |
| 7,241,697 B2 * | 7/2007 | Pinarbasi | 438/738 |
| 7,305,753 B2 | 12/2007 | Kobayashi | |
| 7,497,009 B2 | 3/2009 | Kobayashi | |
| 7,563,381 B2 * | 7/2009 | Baer et al. | 216/22 |
| 2004/0042118 A1 | 3/2004 | Notsuke et al. | |
| 2006/0044677 A1 | 3/2006 | Li et al. | |
| 2006/0078553 A1 | 4/2006 | Glidden | |
| 2006/0098339 A1 | 5/2006 | Koyama et al. | |
| 2006/0221497 A1 * | 10/2006 | Okada et al. | 360/125 |
| 2006/0238918 A1 | 10/2006 | Kato et al. | |
| 2007/0115584 A1 | 5/2007 | Balamane et al. | |
| 2007/0139820 A1 | 6/2007 | Carey et al. | |
| 2007/0223139 A1 | 9/2007 | Tachibana et al. | |
| 2008/0026254 A1 | 1/2008 | Hsiao et al. | |
| 2008/0072417 A1 | 3/2008 | Hsu et al. | |
| 2008/0145524 A1 | 6/2008 | Guthrie et al. | |
| 2008/0218902 A1 | 9/2008 | Hosono et al. | |
| 2008/0266720 A1 * | 10/2008 | Yazawa et al. | 360/314 |
| 2010/0110575 A1 * | 5/2010 | Gao | 360/57 |
| 2011/0075299 A1 * | 3/2011 | Olson et al. | 360/235.4 |

FOREIGN PATENT DOCUMENTS

EP 0969450 A1 1/2000

* cited by examiner

*Primary Examiner* — Paul D Kim

(57) ABSTRACT

A method of forming a write pole for a magnetic recording device is provided. The method comprises providing a layer of magnetic material covered with a secondary hard mask layer and a patterned primary hard mask, milling at a first milling angle to transfer a pattern from the patterned primary hard mask to the secondary hard mask, and milling at a second milling angle to transfer the pattern from the secondary hard mask to the layer of magnetic material to form the write pole. The second milling angle is greater than the first milling angle. The method further comprises milling at a third milling angle to adjust a side wall angle of the write pole to about a desired side wall angle, and milling at a fourth milling angle to reduce a track width of the write pole to a desired track width.

19 Claims, 8 Drawing Sheets

Fig. 1

Prior Art

Fig. 2

Prior Art

TUNABLE POLE TRIM PROCESSES FOR FABRICATING TRAPEZOIDAL PERPENDICULAR MAGNETIC RECORDING (PMR) WRITE POLES

FIELD OF THE INVENTION

The present invention generally relates to hard disk drives and, in particular, relates to tunable pole trim processes for fabricating trapezoidal perpendicular magnetic recording ("PMR") write poles.

BACKGROUND OF THE INVENTION

Hard disk drives include one or more rigid disks, which are coated with a magnetic recording medium in which data can be stored. Hard disk drives further include read and write heads for interacting with the data in the magnetic recording medium. The write head includes an inductive element for generating a magnetic field that aligns the magnetic moments of domains in the magnetic recording medium to represent bits of data.

Magnetic recording techniques include both longitudinal and perpendicular recording. Perpendicular magnetic recording ("PMR") is a form of magnetic recording in which the magnetic moments representing bits of data are oriented perpendicularly to the surface of the magnetic recording medium, as opposed to longitudinally along a track thereof. PMR enjoys a number of advantages over longitudinal recording, such as significantly higher areal density recording capability.

Write poles with a trapezoidal cross-sectional shape at the air bearing surface ("ABS") are used to provide improved writing performance in PMR heads. The manufacture of write poles with this trapezoidal cross-sectional shape presents a number of difficulties, however, not the least of which involve providing the pole with both desired side wall angles and desired track width, as these parameters are dependent upon one another in the manufacturing process. In this regard, in some manufacturing processes, attempting to achieve a specific side wall angle may result in an undesirable track width, and vice versa.

Figure 1:
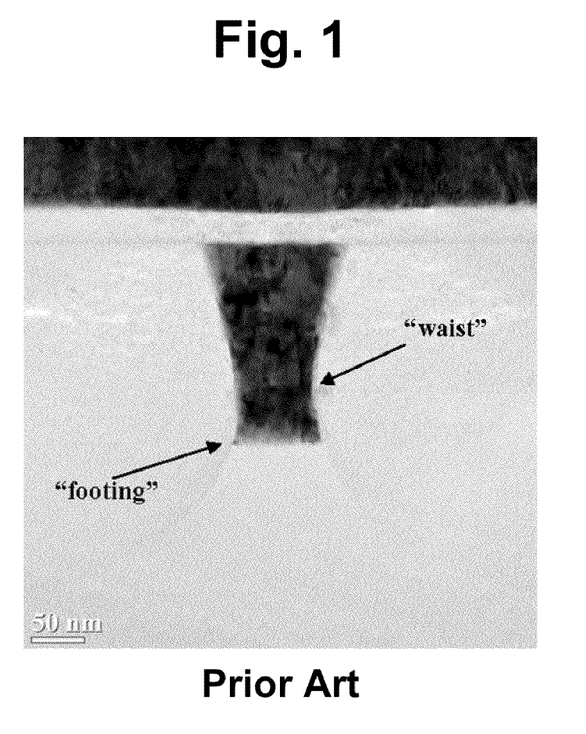
FIG. 1 illustrates a trapezoidal write pole having a waist and a footing.
Figure 2:
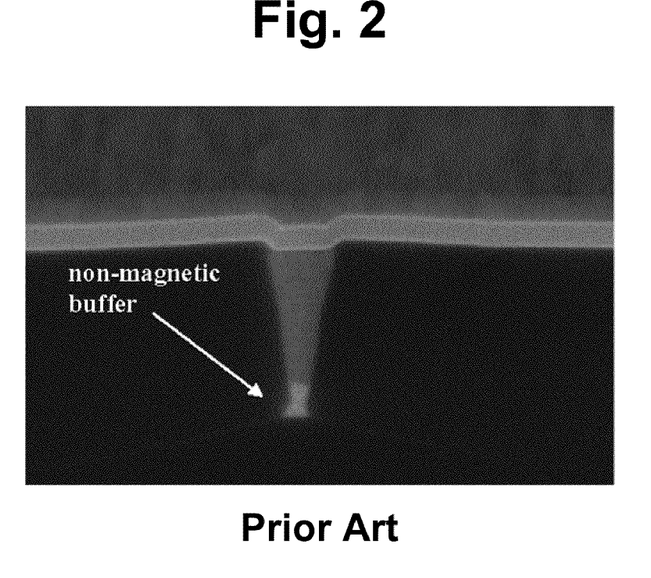
FIG. 2 illustrates a trapezoidal write pole formed over a non-magnetic buffer layer.

Moreover, when attempting to mill a write pole with a trapezoidal cross-sectional shape from a layer of magnetic material, manufacturing challenges can make it difficult to obtain a good trapezoidal shape. For example, as the magnetic material from which the write pole is milled may be deposited on a hard material such as alumina, the bottom of the pole (i.e., the trailing edge thereof) is often pinned during the final stage of the pole trim, rendering a sort of a "footing" feature which makes the pole profile appear to be pinched at a "waist" thereof. This effect is illustrated in FIG. 1, in which a scanning electron micrograph of a write pole is shown in cross-section. In the write pole of FIG. 1, a distinct "waist" and "footing" can be seen. To address this manufacturing limitation, some processes involve milling a write pole from a layer of magnetic material disposed over a non-magnetic buffer layer, whereby the footing is formed in the non-magnetic buffer, such that the portion of the structure comprising magnetic material approximates a trapezoidal shape. One such configuration is illustrated in FIG. 2. This approach suffers from notable drawbacks, such as pole protrusion, which can result when the non-magnetic buffer layer is heated during write operations and extends beyond the air bearing surface.

SUMMARY OF THE INVENTION

Various embodiments of the present invention solve the foregoing problems by providing tunable pole trim processes for fabricating trapezoidal PMR write poles, in which the side wall angle and track width parameters are largely decoupled. In this regard, the disclosed processes allow for the precise manufacture of PMR write poles with desired side wall angles and track widths, without the inclusion of problematic non-magnetic buffer layers.

According to one embodiment of the subject disclosure, a method of forming a write pole for a magnetic recording device is provided. The method comprises providing a layer of magnetic material covered with a secondary hard mask layer and a patterned primary hard mask, a first milling step comprising milling at a first milling angle to transfer a pattern from the patterned primary hard mask to the secondary hard mask, and a second milling step comprising milling at a second milling angle to transfer the pattern from the secondary hard mask to the layer of magnetic material to form the write pole. The second milling angle is greater than the first milling angle. The method further comprises a third milling step comprising milling at a third milling angle to adjust a side wall angle of the write pole to about a desired side wall angle, and a fourth milling step comprising milling at a fourth milling angle to reduce a track width of the write pole to a desired track width.

It is to be understood that both the foregoing summary of the invention and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION OF THE INVENTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

Figure 3:
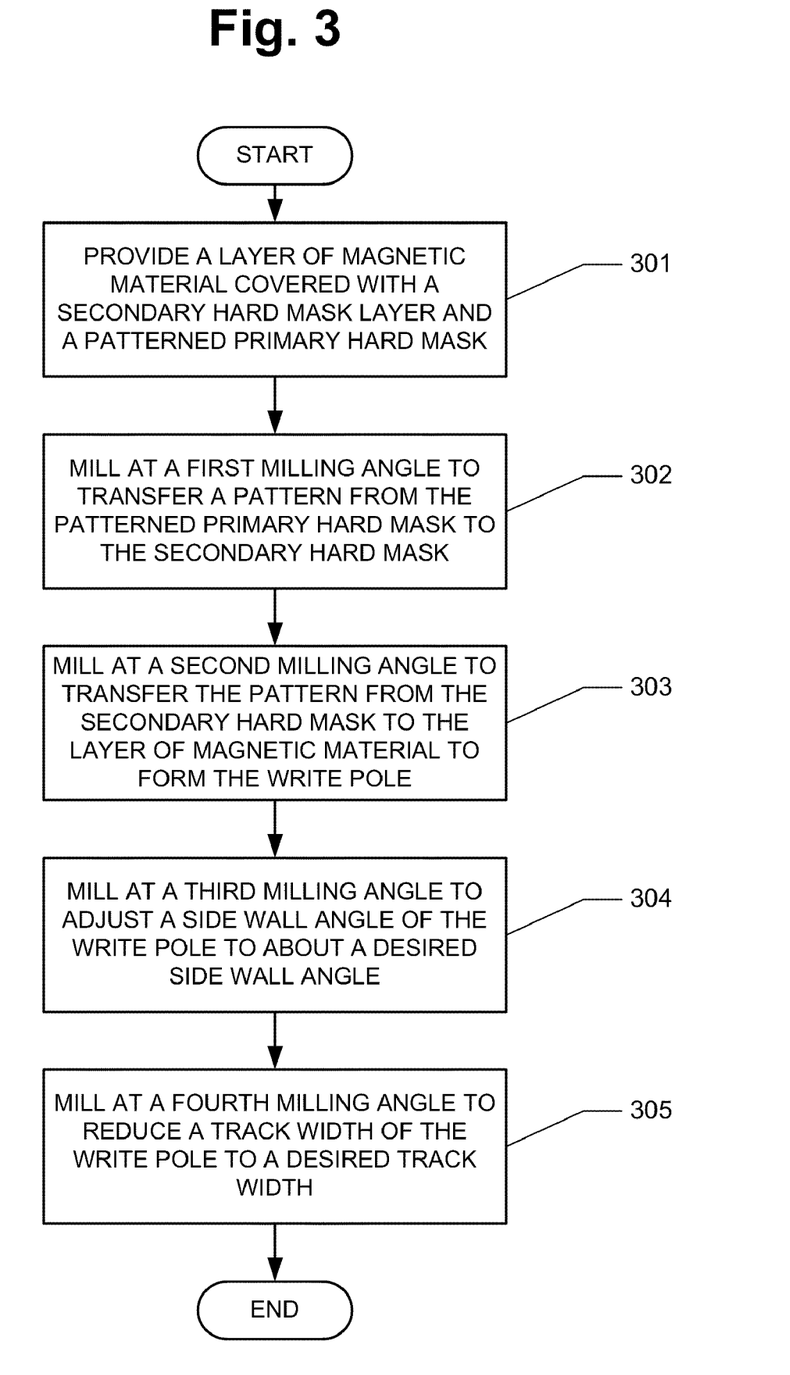
FIG. 3 is a flow chart illustrating a method of forming a write pole for a magnetic recording device in accordance with one aspect of the subject disclosure.

FIG. 3 is a flowchart illustrating a method of forming a write pole for a magnetic recording device in accordance with one aspect of the subject disclosure. The method begins with step 301, in which a structure comprising a layer of magnetic material covered with a secondary hard mask layer and a patterned primary hard mask is provided. One such exemplary structure is illustrated in cross-section in FIG. 4, in accordance with one aspect of the subject disclosure. As can be seen with reference to FIG. 4, a substrate layer 401 is covered with a layer of magnetic material 402 (e.g., CoNiFe or the like) from which the write pole will be milled. The layer of magnetic material 402 is covered in turn with a secondary hard mask 403 and a patterned primary hard mask 404.

The primary mask layer may be composed of any one of a number of suitable hard mask materials known to those of skill in the art, including, for example, photoresist, a polymer, a metal, an alloy, a dielectric, diamond-like carbon, or some combination thereof. The pattern in the primary hard mask may be configured to provide the overhead shape of the write pole (e.g., a nose region, a yoke region and the like). The width of the primary hard mask may be greater than the desired final track width of the write pole to be formed. The height of the primary hard mask may be selected such that it will withstand the first three milling steps of the ion milling process (as set forth in greater detail below).

Figure 4:
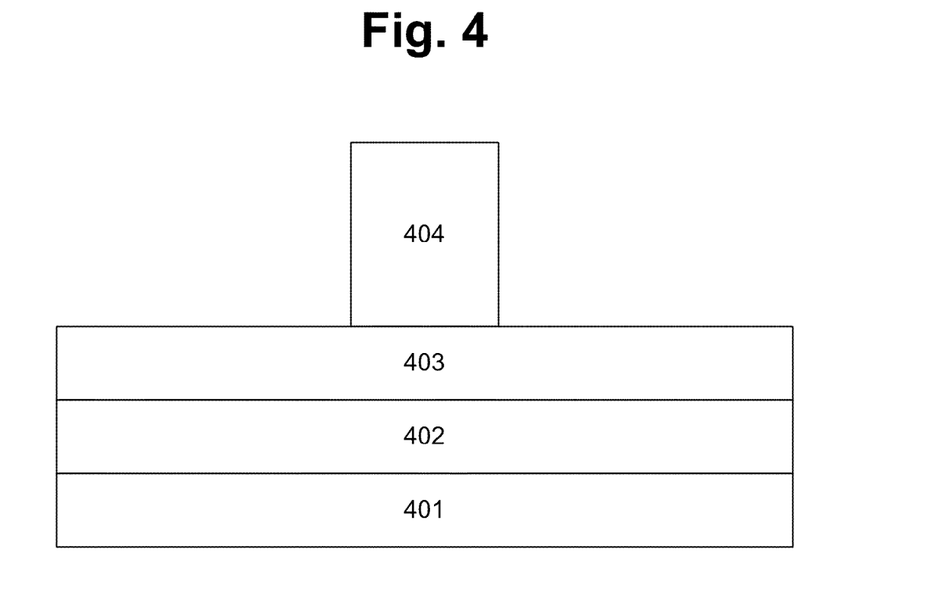
FIG. 4 is a block diagram illustrating a layered structure from which a write pole for a magnetic recording device is formed, at one stage of the formation thereof, in accordance with one aspect of the subject disclosure.

The secondary mask layer may be comprised of any one of a number of suitable hard mask materials, including, for example, one or more layers of metal and/or dielectric materials. As is illustrated in FIG. 4, the thickness of the secondary mask layer may be substantially the same as a thickness of the layer of magnetic material. The secondary hard mask may be chosen from a material or materials that have low sputtering yield at a high ion beam milling angle $\theta$.

Returning to FIG. 3, in step 302, the process continues with a first milling step, in which the structure is milled at a first milling angle $\theta_1$ to transfer a pattern from patterned primary hard mask 404 to secondary hard mask 403. According to one exemplary aspect of the subject disclosure, the first milling angle $\theta_1$ may be a steep angle (e.g., between about 0° and 20°) to more reliably transfer the pattern from patterned primary hard mask 404 to secondary hard mask 403. This step of ion milling may be performed in a full rotation (i.e., in which the milling ion beam comes from all 360 degrees of azimuth angle) for better uniformity. Alternatively, this ion milling step may be performed in either a sweeping fashion (i.e., in which the ion beam comes from a smaller range of azimuth angles) or in a static fashion (i.e., in which the ion beam comes from a fixed azimuth angle). With this trim step some penetration into the magnetic media layer may also be achieved.

Figure 5:
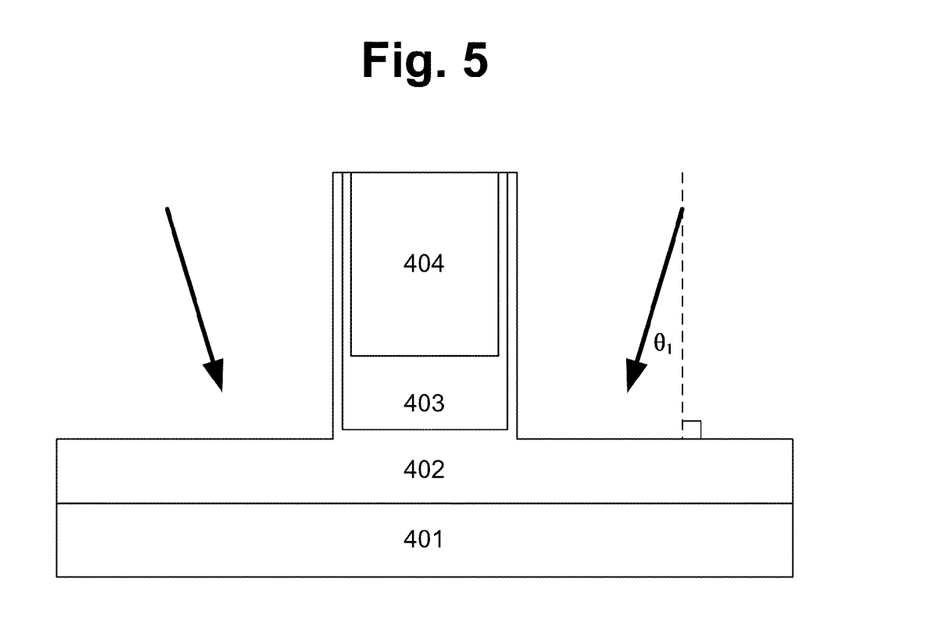
FIG. 5 is a block diagram illustrating a layered structure from which a write pole for a magnetic recording device is formed, at one stage of the formation thereof, in accordance with one aspect of the subject disclosure.

The structure resulting from step 302 is illustrated in exemplary FIG. 5, in accordance with one aspect of the subject disclosure. As can be seen with reference to FIG. 5, ion milling at angle $\theta_1$ has transferred the pattern from primary hard mask 404 to secondary hard mask 403 and etched part of the way into the layer of magnetic material 402 to leave a desired thickness thereof (which is an important parameter in setting the side wall angle in the following steps).

Returning to FIG. 3, in step 303, the process continues with a second milling step, in which the structure of FIG. 5 is milled at a second milling angle $\theta_2$ to transfer the pattern from the secondary hard mask 403 to the layer of magnetic material 402 in order to form the write pole. This step of ion milling may be performed in a full rotation (i.e., in which the milling ion beam comes from all 360 degrees of azimuth angle) for better uniformity. Alternatively, this ion milling step may be performed in either a sweeping fashion (i.e., in which the ion beam comes from a smaller range of azimuth angles) or in a static fashion (i.e., in which the ion beam comes from a fixed azimuth angle). According to one aspect of the subject disclosure, the second milling angle may be greater than the first milling angle. For example, the second milling angle may be between about 45° and 70°.

According to one aspect of the subject disclosure, the second milling step may comprise milling the structure of FIG. 5 with a combination of beam angles. All of the beam angles may be greater than the first beam angle of the first milling step. For example, according to one exemplary aspect of the subject disclosure, at least two angles may be used, so that the time ratio between the two angle millings may be manipulated to tune the side wall angle. Combined with the remaining height of the layer of magnetic material 402 from the previous step, the choice of beam angles and the ratio of time spent milling the different angles can be configured to achieve a side wall angle in the range of a few degrees to tens of degrees, responding to various design requirements. For example, a ratio between the durations of the two angle millings of step 303 may be selected to adjust the side wall angle of the write pole to between about 110% and 125% of the desired final side wall angle.

At the end of step 303, the side wall angle may be close to the desired target side wall angle. After the second milling step of step 303, a footing may also appear at the base of the pole. The footing relieves the pinning effect of the substrate layer 401 and facilitates the generation and tuning of SA. The resultant structure following the second milling step 303 is illustrated in FIG. 6, in accordance with one aspect of the subject disclosure.

Figure 6:
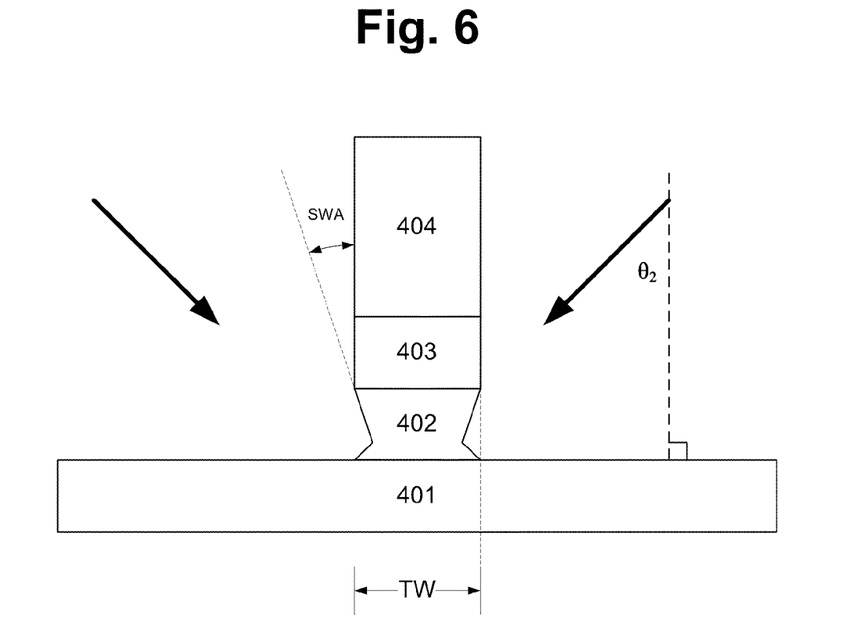
FIG. 6 is a block diagram illustrating a layered structure from which a write pole for a magnetic recording device is formed, at one stage of the formation thereof, in accordance with one aspect of the subject disclosure.

As can be seen with reference to FIG. 6, the pattern previously transferred from primary hard mask 404 to secondary hard mask 403 has now been transferred to the layer of magnetic material 402. As can also be seen with reference to FIG. 6, the layer of magnetic material 402 has been formed into a rough write pole, with a track width ("TW") and a side wall angle ("SWA"), but also with a "footing" of material where it abuts substrate layer 401.

Returning to FIG. 3, in step 304, the process continues with a third milling step, in which the structure of FIG. 6 is milled at a third milling angle $\theta_3$ to adjust a side wall angle of the write pole to about a desired side wall angle and to pre-target the desired track width. This step of ion milling may be performed in a full rotation (i.e., in which the milling ion beam comes from all 360 degrees of azimuth angle) for better uniformity. Alternatively, this ion milling step may be performed in either a sweeping fashion (i.e., in which the ion beam comes from a smaller range of azimuth angles) or in a static fashion (i.e., in which the ion beam comes from a fixed azimuth angle). In accordance with one aspect of the subject disclosure, the third milling angle may be between about 55° and 70°. This step may help to minimize wafer-to-wafer variations in both track width and side wall angle. At the end of this step the footing may or may not remain.

At the end of step 304, the side wall angle may be between about 105% and 110% of the desired final side wall angle. The third milling step may be further configured to reduce the track width of the write pole to between about 105% and 120% of the desired track width. The resultant structure following the third milling step 304 is illustrated in FIG. 7, in accordance with one aspect of the subject disclosure.

Figure 7:
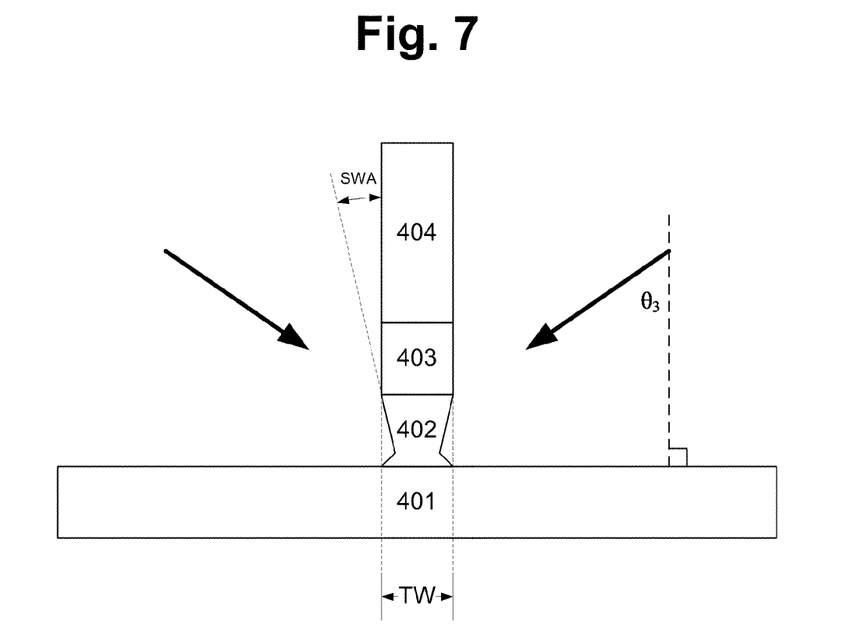
FIG. 7 is a block diagram illustrating a layered structure from which a write pole for a magnetic recording device is formed, at one stage of the formation thereof, in accordance with one aspect of the subject disclosure.

As can be seen with reference to FIG. 7, the track width TW of write pole 402 has been reduced by the third milling step 304, and the side wall angle has been adjusted to about 105% to 110% of the final side wall angle. As can also be seen with reference to FIG. 7, write pole 402 still retails a footing following the third milling step 304.

Figure 9:
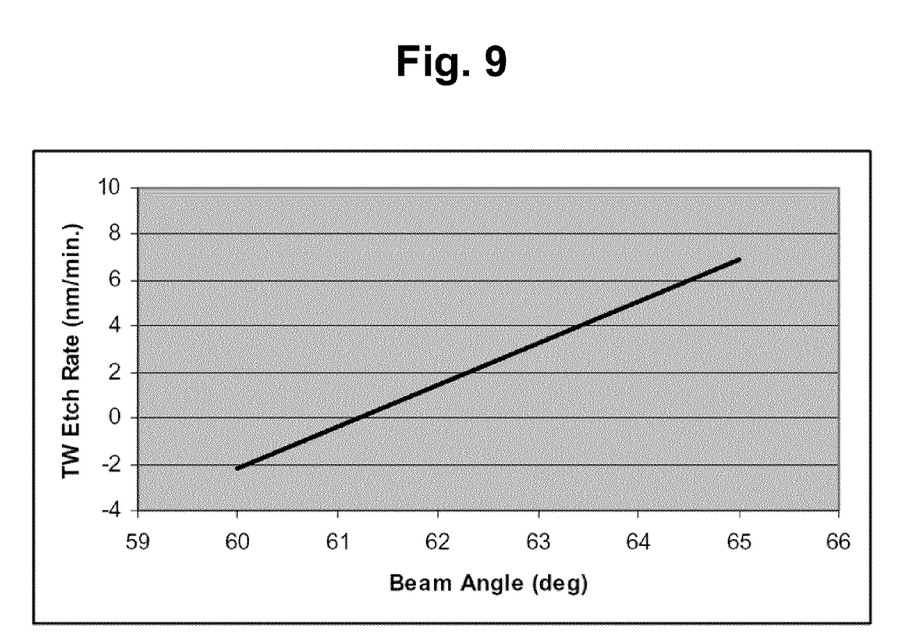
FIG. 9 is a graph illustrating an exemplary relationship between a milling beam angle and a track width etch rate, in accordance with one aspect of the subject disclosure.
Figure 10:
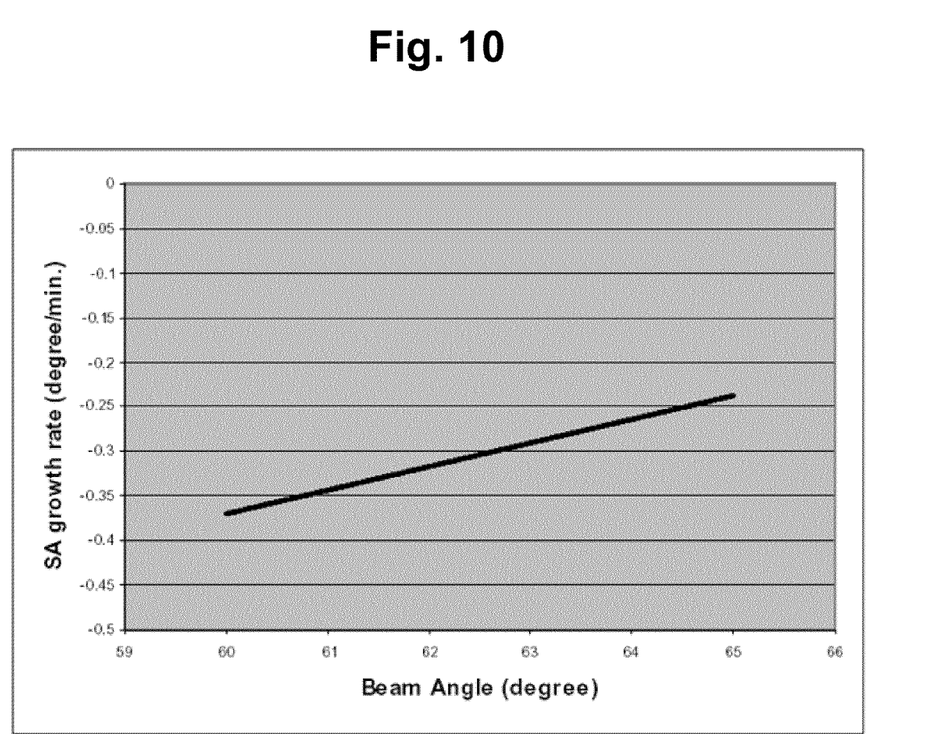
FIG. 10 is a graph illustrating an exemplary relationship between a milling beam angle and a side wall angle growth rate, in accordance with one aspect of the subject disclosure.

Turning ahead to FIGS. 9 and 10, which illustrate exemplary track width etch rates and side wall angle growth rates for different ion milling angles in accordance with one aspect of the subject disclosure, a milling angle for third milling step 304 may be chosen to achieve both a desired track width etch rate and a desired side wall angle growth rate. For example, as can be seen by comparing FIGS. 9 and 10, choosing a higher beam angle for the third milling step 304 will tune the side wall angle at a slower rate and etch the track width at a faster rate, and vice versa.

Returning to FIG. 3, in step 305, the process continues with a fourth milling step, in which the structure of FIG. 7 is milled at a fourth milling angle $\theta_4$ to reduce the track width of write pole 402 to the desired final track width. This step of ion milling may be performed in a full rotation (i.e., in which the milling ion beam comes from all 360 degrees of azimuth angle) for better uniformity. Alternatively, this ion milling step may be performed in either a sweeping fashion (i.e., in which the ion beam comes from a smaller range of azimuth angles) or in a static fashion (i.e., in which the ion beam comes from a fixed azimuth angle). In accordance with one aspect of the subject disclosure, the third milling angle may be between about 60° and 70°. The fourth milling step may also be configured to adjust the side wall angle of the write pole to the desired final side wall angle. In this regard, the fourth milling angle may be chosen to maximize a rate of change of the track width while minimizing a rate of change of the side wall angle (which has been to about 105% to 110% of the final side wall angle in the previous step). In this step, the side wall angle tends to decrease very slowly, such that the side wall angle targeting is essentially de-coupled from the track width targeting. As can be seen with reference to FIGS. 9 and 10, the etch rate for the track width goes from negative (i.e., as a result of re-deposition) to positive with increasing beam angle. Based on the side wall angle and track width values produced by the third milling step, the beam angle and etch time for the fourth milling step may be chosen to achieve the track width target while slightly reducing the side wall angle to its final target.

According to one aspect of the subject disclosure, any footing remaining on the write pole after the third milling step may be removed in the fourth milling step. Milling at a shallower angle will remove the footing from the lower edge of the write pole more efficiently. As a result of this milling step, any footing remaining from previous step may be completely removed, producing a simple trapezoidal or triangular cross-sectional shape for the write pole (near the air bearing surface thereof).

Figure 8:
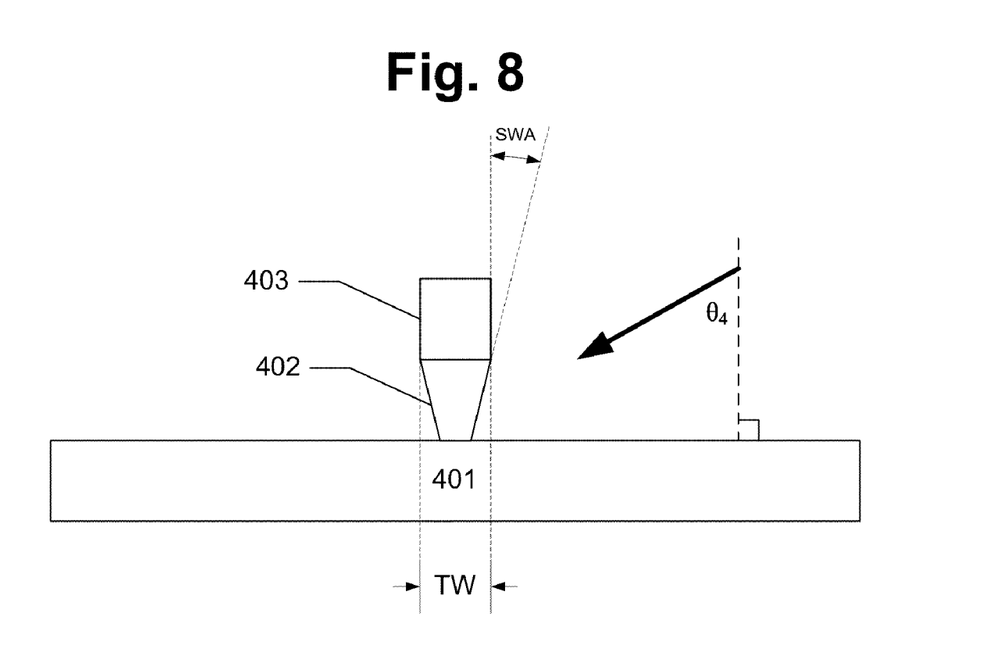
FIG. 8 is a block diagram illustrating a write pole for a magnetic recording device, in accordance with one aspect of the subject disclosure.

The resultant structure following the fourth milling step 304 is illustrated in FIG. 8, in accordance with one aspect of the subject disclosure. As can be seen with reference to FIG. 8, write pole 402 has a final track width ("TW") and a final side wall angle ("SWA"), and has a simple trapezoidal cross-sectional shape. As can also be seen with reference to FIG. 8, following the fourth milling step 304, primary hard mask 404 may be completely removed by the milling processes.

In accordance with one aspect of the subject disclosure, the foregoing method may be performed iteratively with one or more measuring steps, whereby following a milling step, one or more write poles in a wafer may be measured to determine the progress of the milling operation, in order to select appropriate milling angles and etch times for subsequent milling steps. For example, after the first milling step, the remaining thickness of the layer of magnetic material may be measured to determine an appropriate etch time for the second milling step. Similarly, after the second or third milling steps, the track width and/or side wall angles of one or more write poles in the wafer may be measured to set the parameters for subsequent milling steps.

Figure 11:
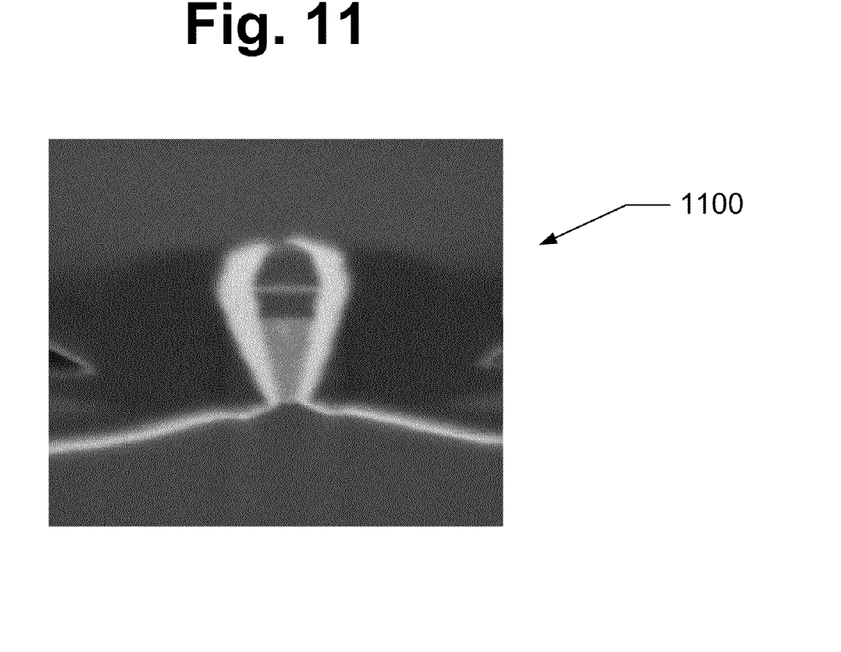
FIGS. 11 and 12 are scanning electron microscope images of exemplary write poles for magnetic recording devices, in accordance with various aspects of the subject disclosure.
Figure 12:
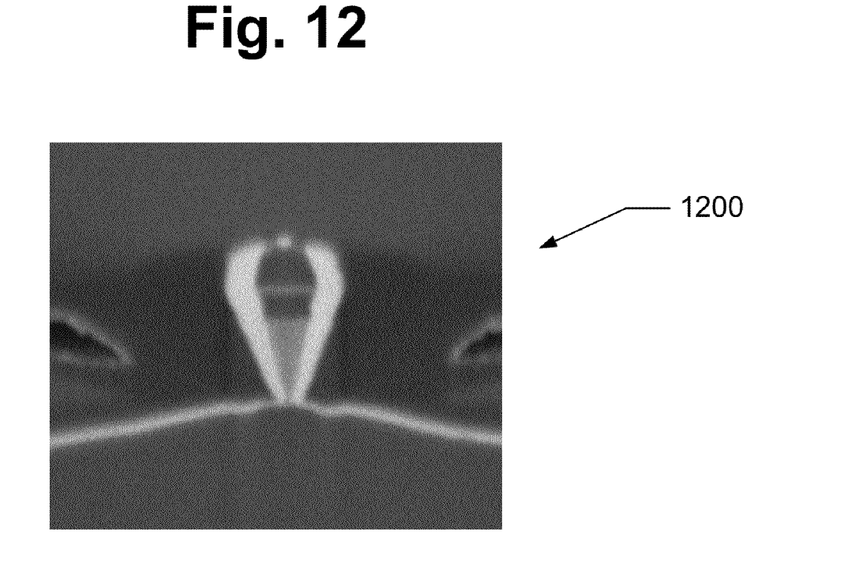

FIGS. 11 and 12 are scanning electron microscope images of exemplary write poles for magnetic recording devices, in accordance with various aspects of the subject disclosure. As can be seen with reference to FIGS. 11 and 12, the write poles 1100 and 1200 have simple trapezoidal (1100) and triangular (1200) cross sections, are free from any "footing" or "waist," and do not rest upon a non-magnetic buffer layer.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. A method of forming a write pole for a magnetic recording device, comprising:

providing a layer of magnetic material covered with a secondary hard mask layer and a patterned primary hard mask;

a first milling step comprising milling at a first milling angle to transfer a pattern from the patterned primary hard mask to the secondary hard mask;

a second milling step comprising milling at a second milling angle to transfer the pattern from the secondary hard mask to the layer of magnetic material to form the write pole, wherein the second milling angle is greater than the first milling angle;

a third milling step comprising milling at a third milling angle to adjust a side wall angle of the write pole to about a desired side wall angle; and a fourth milling step comprising milling at a fourth milling angle to reduce a track width of the write pole to a desired track width, wherein the fourth milling angle is configured to maximize a rate of change of the track width while minimizing a rate of change of the side wall angle.

2. The method according to claim 1, wherein first milling angle is between about 0° and 20°.

3. The method according to claim 1, wherein the second milling step comprises milling at the second milling angle for a first duration and milling at a fifth milling angle for a second duration, and wherein a ratio between the first and second durations is selected to adjust the side wall angle of the write pole to between about 110% and 125% of the desired side wall angle.

4. The method according to claim 3, wherein the second milling angle and the fifth milling angle are each between about 45° and 70°.

5. The method according to claim 1, wherein the third milling angle is between about 55° and 70°.

6. The method according to claim 1, wherein the third milling step is configured to adjust the side wall angle of the write pole to between about 105% and 110% of the desired side wall angle.

7. The method according to claim 1, wherein the third milling step is configured to reduce the track width of the write pole to between about 105% and 120% of the desired track width.

8. The method according to claim 1, wherein the fourth milling angle is between about 60° and 70°.

9. The method according to claim 1, wherein the fourth milling step is configured to adjust the side wall angle of the write pole to the desired side wall angle.

10. The method according to claim 1, wherein the fourth milling step is configured to remove a footing from a lower edge of the write pole.

11. The method according to claim 1, wherein one or more of the first, second, third and fourth milling steps comprise rotational milling.

12. The method according to claim 1, wherein one or more of the first, second, third and fourth milling steps comprise sweeping milling.

13. The method according to claim 1, wherein one or more of the first, second, third and fourth milling steps comprise static milling.

14. The method according to claim 1, further comprising measuring a second write pole in a same wafer as the write pole after the first milling step and before the fourth milling step to adjust one or more of a milling angle and a duration of a subsequent milling step based upon a measured dimension of the second write pole.

15. The method according to claim 1, wherein the primary mask layer comprises one or more of photoresist, a polymer, a metal, an alloy, a dielectric, or diamond-like carbon.

16. The method according to claim 1, wherein the secondary mask layer comprises one or more layers selected from the group consisting of metals and dielectrics.

17. The method according to claim 1, wherein a thickness of the secondary mask layer is substantially the same as a thickness of the layer of magnetic material.

18. The method according to claim 1, wherein after the fourth milling step, the write pole has a trapezoidal cross-sectional shape near an air bearing surface thereof.

19. The method according to claim 1, wherein after the fourth milling step, the write pole has a triangular cross-sectional shape near an air bearing surface thereof.

* * * * *